United States Patent
Shiroma et al.

(10) Patent No.: US 11,633,793 B2
(45) Date of Patent: Apr. 25, 2023

(54) CUTTING INSERT

(71) Applicant: TUNGALOY CORPORATION, Fukushima (JP)

(72) Inventors: Hikaru Shiroma, Iwaki (JP); Satoru Yoshida, Iwaki (JP)

(73) Assignee: TUNGALOY CORPORATION, Fukushima (JP)

( * ) Notice: Subject to any disclaimer, the term of this patent is extended or adjusted under 35 U.S.C. 154(b) by 0 days.

(21) Appl. No.: 17/569,562

(22) Filed: Jan. 6, 2022

(65) Prior Publication Data
US 2022/0250174 A1    Aug. 11, 2022

(30) Foreign Application Priority Data
Feb. 10, 2021    (JP) .............................. JP2021-019455

(51) Int. Cl.
*B23C 5/20* (2006.01)
*B23C 5/10* (2006.01)

(52) U.S. Cl.
CPC .............. *B23C 5/109* (2013.01); *B23C 5/202* (2013.01); *B23C 2200/0433* (2013.01); *B23C 2200/0494* (2013.01); *B23C 2200/367* (2013.01)

(58) Field of Classification Search
CPC . B23C 5/109; B23C 5/202; B23C 2200/0433; B23C 2200/0494; B23C 2200/367; B23C 2200/208; B23C 2200/283; B23C 2200/286; B23C 5/205; B23C 2200/0411; B23C 2200/08; B23C 2200/085; B23C 2200/086; B23C 2210/20
See application file for complete search history.

(56) References Cited

U.S. PATENT DOCUMENTS

| | | | | |
|---|---|---|---|---|
| 7,494,303 B2 * | 2/2009 | Koskinen | .................. | B23C 5/06 407/113 |
| 7,901,161 B2 * | 3/2011 | Jansson | ..................... | B23C 5/06 407/113 |

(Continued)

FOREIGN PATENT DOCUMENTS

| | | | | |
|---|---|---|---|---|
| DE | 102012017024 A1 * | 3/2014 | ........... | B23B 27/141 |
| DE | 102014113019 A1 * | 3/2015 | ............... | B23C 5/06 |

(Continued)

*Primary Examiner* — Sara Addisu
(74) *Attorney, Agent, or Firm* — Studebaker & Brackett PC

(57) ABSTRACT

Provided is a cutting insert which is resistant to breakage and can stably be restrained. A cutting insert configured as a vertically mounted insert has a first rake face adjacent to a first major cutting edge, a second rake face adjacent to a second major cutting edge, a restraint surface located further inward than the first and second rake faces to come into contact with a tool body when a second end surface is used, and a reinforcing portion projecting from the restraint surface. The reinforcing portion has a third projecting ridge provided to extend between the first and second rake faces and halve the restraint surface, a first projecting ridge connected to one end of the third projecting ridge to extend so as to cover at least a portion of a boundary between the first rake face and the restraint surface, and a second projecting ridge connected to another end of the third projecting ridge so as to cover at least a portion of a boundary between the second rake face and the restraint surface.

7 Claims, 9 Drawing Sheets

(56) References Cited

U.S. PATENT DOCUMENTS

| | | | | |
|---|---|---|---|---|
| 8,282,320 | B2* | 10/2012 | Hartlohner | B23B 27/1618 |
| | | | | 407/113 |
| 8,430,606 | B2* | 4/2013 | Zettler | B23C 5/202 |
| | | | | 407/42 |
| 9,168,590 | B2* | 10/2015 | Kaufmann | B23B 27/1607 |
| 9,205,499 | B2* | 12/2015 | Morrison | B23C 5/202 |
| 9,744,597 | B2* | 8/2017 | Wernh | B23B 27/1622 |
| 9,925,596 | B2* | 3/2018 | Johansson | B23B 27/10 |
| 9,981,323 | B2* | 5/2018 | Fang | B23C 5/08 |
| 10,076,795 | B2* | 9/2018 | Dagan | B23C 5/02 |
| 11,185,931 | B2* | 11/2021 | Andoh | B23B 27/22 |
| 2009/0155004 | A1* | 6/2009 | Jansson | B23C 5/202 |
| | | | | 407/42 |
| 2013/0195566 | A1* | 8/2013 | Bhagath | B23C 5/202 |
| | | | | 407/113 |
| 2014/0348599 | A1* | 11/2014 | Kovac | B23C 5/202 |
| | | | | 407/42 |
| 2015/0202698 | A1* | 7/2015 | Morrison | B23C 5/2472 |
| | | | | 407/36 |
| 2018/0257155 | A1* | 9/2018 | Kitajima | B23C 5/20 |
| 2019/0240746 | A1 | 8/2019 | Kitajima et al. | |
| 2021/0060668 | A1* | 3/2021 | Yoshida | B23C 5/109 |
| 2022/0250164 | A1* | 8/2022 | Shiroma | B23C 5/109 |

FOREIGN PATENT DOCUMENTS

| | | | | |
|---|---|---|---|---|
| JP | 2017056552 A | * | 3/2017 | B23C 5/10 |
| JP | 2019-136802 A | | 8/2019 | |
| JP | 2021030399 A | * | 3/2021 | B23C 5/109 |
| WO | WO-2014104489 A1 | * | 7/2014 | B23B 27/16 |

* cited by examiner

CUTTING INSERT

CROSS-REFERENCES TO RELATED APPLICATIONS

This application relates to and claims priority from Japanese Patent Application No. 2021-019455, filed on Feb. 10, 2021, the entire disclosure of which is incorporated herein by reference.

BACKGROUND

Field

The present invention relates to a cutting insert.

Description of Related Art

When a surface, which is formed with a cutting edge to be used and a rake face thereof, of a cutting insert is assumed to be an upper surface of the cutting insert, a lower surface of the cutting insert on the opposite side to the upper surface is formed with a restraint surface that comes into contact with a tool body. In a cutting insert that can be re-used after being turned upside down, each of the upper surface and the lower surface is formed with both a rake face and a restraint surface. In a horizontally mounted insert, a mounting hole through which a fastening screw is to be inserted is formed so as to extend through the upper surface and the lower surface. Meanwhile, in a vertically mounted insert, a mounting hole is formed so as to extend through, not an upper surface and a lower surface, but a side surface joining the upper and lower surfaces together (see, e.g., Japanese Patent No. 6424975).

SUMMARY

In the vertically mounted insert, a cutting resistance acts, not in an axial direction, but in a radial direction, on a fastening screw inserted through the mounting hole. When the fastening screw is thin, the fastening screw may be bent in the radial direction and, accordingly, in the vertically mounted insert, an inner diameter of the mounting hole is larger than that in a horizontally mounted insert having a similar size. When the inner diameter of the mounting hole is larger, a thinner portion is formed between the upper surface and the mounting hole, and the cutting insert is more likely to be broken.

In addition, in the vertically mounted insert, each of the upper and lower surfaces has no mounting hole, and accordingly the upper and lower surfaces are smaller in size than those in a horizontally mounted insert having a similar size. Since a level difference between a restraint surface and a cutting edge is large and the upper and lower surfaces are smaller in size, the vertically mounted insert mostly has a sharp included angle. When the included angle is small, a strength of an edge deteriorates, and the cutting edge is more likely to be chipped.

It is therefore an object of the present invention to provide a cutting insert which is resistant to breakage and can stably be restrained.

A cutting insert according to an aspect of the preset invention is fixed to a tool body to form a indexable milling tool. The cutting insert includes a first end surface, a second end surface on an opposite side to the first end surface, and a peripheral side surface joining the first end surface and the second end surface together, and is configured as a vertically mounted insert having a mounting hole formed to extend through the peripheral side surface. The second end surface has a third major cutting edge formed on an outer periphery of the second end surface, while the first end surface has a first major cutting edge formed on an outer periphery of the first end surface, a first rake face located further inward of the first end surface than the first major cutting edge and adjacent to the first major cutting edge, a second major cutting edge formed on the outer periphery of the first end surface and facing the first major cutting edge, a second rake face located further inward of the first end surface than the second major cutting edge and adjacent to the second major cutting edge, a restraint surface located further inward than each of the first rake face and the second rake face to come into contact with the tool body when the third major cutting edge is used, and a reinforcing portion projecting from the restraint surface in a direction from the second end surface to the first end surface. The reinforcing portion has a third projecting ridge provided to extend between the first rake face and the second rake face and halve the restraint surface, a first projecting ridge connected to one end of the third projecting ridge to extend so as to cover at least a portion of a boundary between the first rake face and the restraint surface, and a second projecting ridge connected to another end of the third projecting ridge to extend so as to cover at least a portion of a boundary between the second rake face and the restraint surface.

According to the aspect, the reinforcing portion in which the first to third projecting ridges are integrated is formed to extend continuously from the first rake face to the second rake face. The reinforcing portion improves a rigidity of the first end surface, and accordingly even the vertically mounted insert having a sharp included angle is resistant to breakage. In addition, according to the aspect, the first projecting ridge that reinforces the first major cutting edge separates the first rake face and the restraint surface from each other, and consequently, when the first major cutting edge is used, chip having abraded the first rake face is less likely to reach the restraint surface. When the second major cutting edge is used also, the restraint surface is similarly protected. Since a surface of the restraint surface is less likely to be roughened, a state where the cutting insert is restrained is stabilized. If the surface of the restraint surface is roughened by the chip flown out, when the cutting insert is turned upside down and an unused cutting edge is to be used, the state where the cutting insert is restrained may become unstable.

In the aspect described above, it may be possible that the outer periphery of the first end surface is formed in a substantially rectangular shape having first to four corners, the first major cutting edge is located on a long side between the first corner formed with a corner cutting edge and the fourth corner formed with no corner cutting edge, and the first projecting ridge is not disposed between the one end of the third projecting ridge and the fourth corner, while being disposed between the one end of the third projecting ridge and the first corner.

According to the aspect, it is possible to optimize placement of the reinforcing portion and ensure a large area for the restraint surface, while protecting the first end surface. A region extending from the one end of the third projecting ridge toward the first corner where the corner cutting edge is formed is a frequently used portion which constantly receives a stress irrespective of a cutting depth change and which also has a large level difference between the cutting edge and the restraint surface. In such a region where the stress due to a cutting force is likely to be concentrated, the first projecting ridge provided along the first rake face can ensure the rigidity. In addition, since the first rake face and the restraint surface are separated from each other by the first projecting ridge, chip is less likely to reach the restraint surface. In a less frequently used region extending from the one end of the third projecting ridge toward the fourth corner where no corner cutting edge is formed, the first projecting ridge is omitted, and an area of contact with an insert mounting seat can be increased.

In the aspect described above, it may be possible that the reinforcing portion further has a projecting portion located at a center of the first end surface to project from the third projecting ridge in the direction from the second end surface to the first end surface.

According to the aspect, since there is the projecting portion further projecting from the third projecting ridge projecting from the restraint surface, movement of chip beyond the center of the first end surface is inhibited. Chip flown out from a center portion of the first major cutting edge may possibly abrade a surface of the third projecting ridge and move toward the second rake face. When there is the projecting portion, it is possible to protect the second major cutting edge and the second rake face from such chip. When the corners are changed and the cutting insert is to be re-used, the second major cutting edge and the second rake face each having less damage can be used.

In the aspect described above, it may be possible that, when the first end surface is viewed in a direction from the first end surface to the second end surface, the third projecting ridge is superimposed on an axial line of the mounting hole.

According to this aspect, it is possible to intensively reinforce a region immediately above the mounting hole where the first end surface is likely to be thinned.

According to the present invention, it is possible to provide a cutting insert which is resistant to breakage and can stably be restrained.

DETAILED DESCRIPTION

Figure 1:
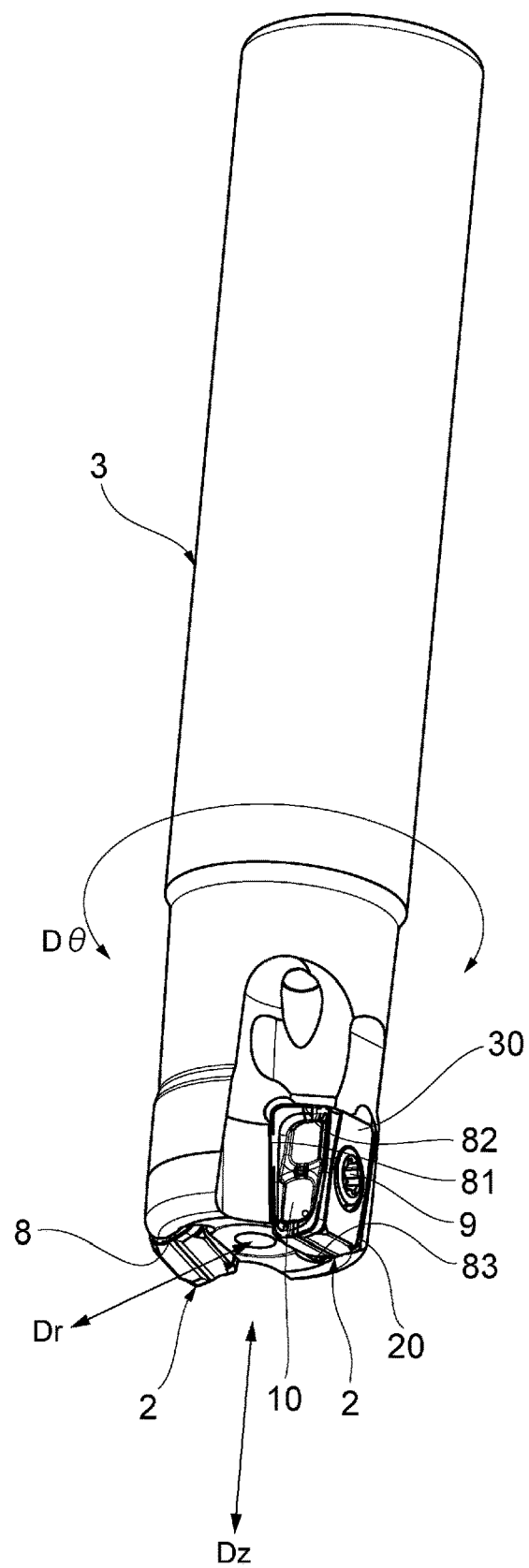
FIG. 1 is a perspective view illustrating an example of a milling tool according to an embodiment of the present invention.

Referring to the accompanying drawings, a description will be given of preferred embodiments of the present invention. Note that, in individual figures, parts given the same reference signs have the same or similar configurations. Each of cutting inserts 2 in one of the embodiments of the present invention is a vertically mounted insert appropriate for a milling tool 1 capable of square shoulder milling (see FIG. 1), and a mounting hole 39 is formed so as to extend through first and third side surfaces 31 and 33 (see FIG. 2).

A characteristic feature of the cutting insert 2 in the present embodiment is that first and second end surfaces 10 and 20 are formed with reinforcing portions 40 and 50 (see FIGS. 5 to 9). The reinforcing portion 40 has integrated first to third projecting ridges 41, 42, and 43. The third projecting ridge 43 extends so as to connect the first and second projecting ridges 41 and 42 to intensively reinforce a portion immediately above the mounting hole 39 (see FIGS. 6 and 9).

The first and second projecting ridges 41 and 42 extend along boundaries B41 and B42 between first and second rake faces 11R and 14R and a restraint surface 19. Since first and second major cutting edges 11, 14 are reinforced by the first and second projecting ridges 41 and 42 to have higher rigidities (see FIG. 7), even when included angles are sharp, the cutting insert 2 is resistant to breakage. Since the first and second rake faces 11R and 14R and the restraint surface 19 are separated from each other by the first and second projecting ridges 41 and 42 (see FIG. 5), chip is less likely to reach the restraint surface 19. Since a surface of the restraint surface 19 is less likely to be roughened, a state where the cutting insert 2 is restrained is stabilized. Referring to FIGS. 1 to 9, a detailed description will be given below of each configuration.

FIG. 1 is a perspective view illustrating an example of the milling tool 1 including the cutting inserts 2 according to the embodiment of the present invention. As illustrated in FIG. 1, the indexable milling tool 1 includes the indexable cutting inserts 2 and a tool body 3 that fixes the cutting inserts 2. A base end portion including a base end of the tool body 3 and the vicinity thereof is fixed to a machine tool and driven to rotate. A leading end portion including a leading end of the tool body 3 and the vicinity thereof is provided with a plurality of insert mounting seats 8. In the illustrated example, the two insert mounting seats 8 are provided. The number of the insert mounting seats 8 is not particularly limited, and may also be one or three or more.

The tool body 3 is configured to be a screw-on type in which a fastening screw 9 is inserted through a mounting hole (through hole) 39 to fasten the cutting inserts 2 to the insert mounting seats 8. Each of the insert mounting seats 8 has a seating surface 81 facing a radial direction Dr of the tool body 3, a seating surface 82 facing an axial direction Dz of the tool body 3, and a seating surface 83 facing a peripheral direction Dθ of the tool body 3. The seating surface 81 facing the radial direction Dr is formed with a screw hole into which the fastening screw 9 is to be screwed.

Each of the cutting inserts 2 is fixed to one of the insert mounting seats 8. The first and second end surfaces 10 and 20 described later are respectively formed with the restraint surface 19 and a restraint surface 29 which are supported in the peripheral direction Dθ from the seating surface 83. The restraint surfaces 19 and 29 come into contact with the seating surface 83 of the insert mounting seat 8 in a state where the cutting insert 2 is fixed to the insert mounting seat 8.

Likewise, the first and third side surfaces 31 and 33 described later are configured as restraint surfaces supported in the radial direction Dr from the seating surface 81. The first and third side surfaces 31 and 33 come into contact with the seating surface 81 of the insert mounting seat 8 in a state where the cutting insert 2 is fixed to the insert mounting seat 8. Second and fourth side surfaces 32 and 34 described later are configured as restraint surfaces supported in the axial direction Dz from the seating surface 82. The second and fourth side surfaces 32 and 34 come into contact with the seating surface 82 of the insert mounting seat 8 in a state where the cutting insert 2 is fixed to the insert mounting seat 8.

Figure 2:
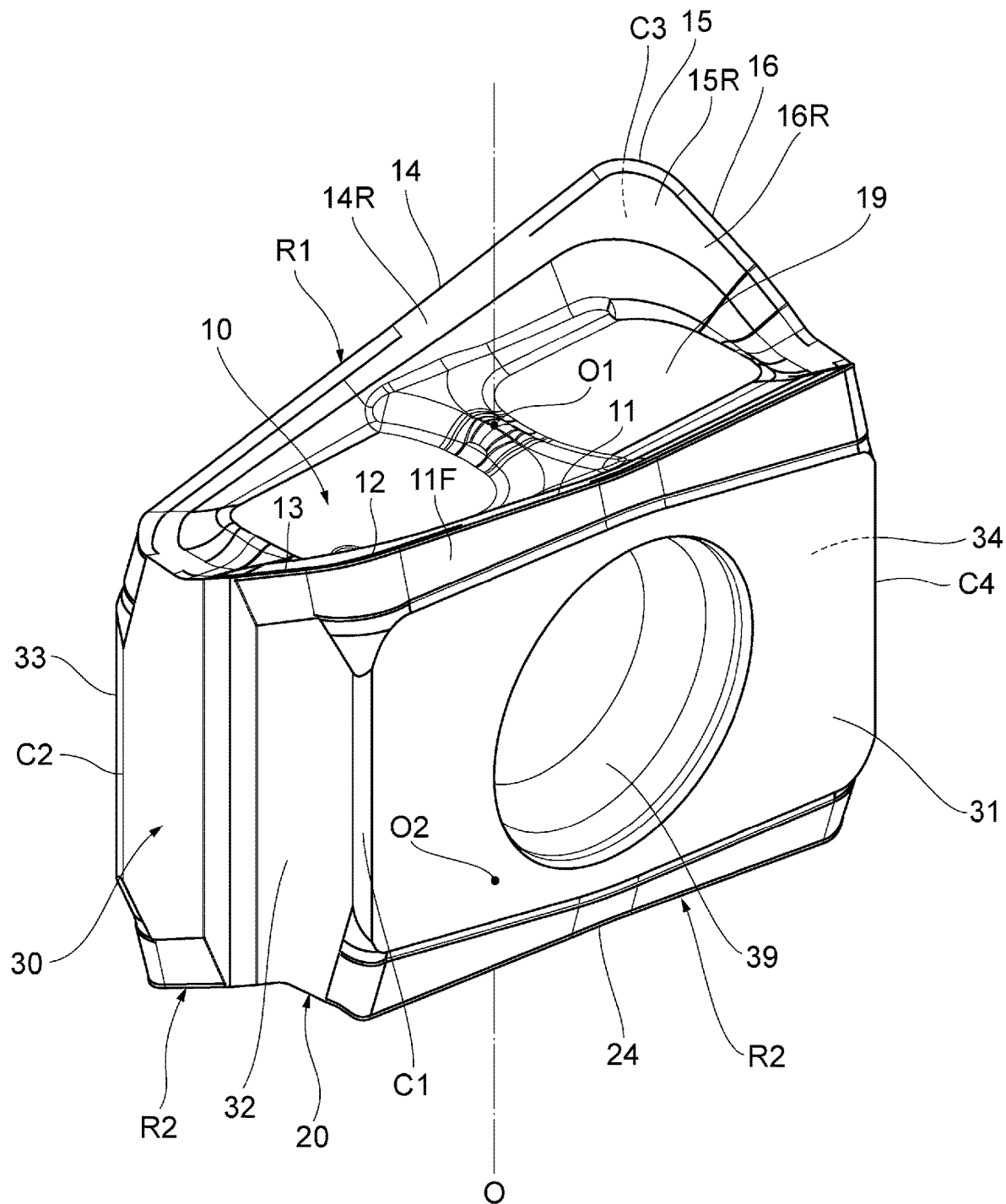
FIG. 2 is a perspective view illustrating an example of a cutting insert according to the embodiment of the present invention.

FIG. 2 is a perspective view illustrating an example of each of the cutting inserts 2 according to the embodiment of the present invention. A material of the cutting insert 2 is not particularly limited, and various materials for cutting inserts represented by cemented carbide can be applied thereto. As illustrated in FIG. 2, the cutting insert 2 has the first end surface 10, the second end surface 20 opposite to the first end surface 10, a peripheral side surface 30 connecting the first and second end surfaces 10 and 20.

In the illustrated example, the first end surface 10 is 180° symmetrically formed around a center O1. Likewise, the second end surface 20 is 180° symmetrically formed around a center O2. In the following description, a straight line connecting the center O1 of the first end surface 10 and the center O2 of the second end surface 20 is referred to as a central axis O of the rake faces. Note that, when the first and second end surfaces 10 and 20 do not have point symmetrical shapes, the centers O1 and O2 thereof are, e.g., gravity centers.

As illustrated in FIG. 2, the cutting insert 2 is formed in a quadrilateral prism shape extending along the central axis O, and the peripheral side surface 30 includes four corners C1, C2, C3, and C4. In the illustrated example, the first end surface 10 has an outer periphery R1 formed in a substantially rectangular shape. The second end surface 20 has an outer periphery R2 formed in a substantially rectangular shape similar to that of the outer periphery R1 of the first end surface 10. In the illustrated example, the first and second end surfaces 10 and 20 have substantially the same shape and function. It may also be possible that the first end surface 10 serves as an upper surface using cutting edges 11 to 16 and the second end surface 20 serves as a lower surface fixed to the insert mounting seat 8 or, alternatively, the second end surface 20 serves as an upper surface and the first end surface 10 serves as a lower surface. Accordingly, a detailed description may be given of the first end surface 10 as a representative, and a repeated description to be given of the second end surface 20 may be omitted. However, the first and second end surfaces 10 and 20 need not necessarily have the same shape.

The peripheral side surface 30 includes the first to fourth side surfaces 31, 32, 33, and 34. The first and third side surfaces 31 and 33 are formed at positions facing long sides of the outer peripheries R1 and R2. The second and fourth side surfaces 32 and 34 are formed at positions facing short sides of the substantially rectangular outer peripheries R1 and R2. The individual side surfaces 31, 32, 33, and 34 are formed in parallel with the central axis O. Each of the first and third side surfaces 31 and 33 occupies a largest area among the restraint surfaces in contact with the insert mounting seat 8, and is formed with the mounting hole 39 through which the fastening screw 9 (see FIG. 1) is to be inserted. Accordingly, the side surfaces 31 and 33 may also be referred to as main restraint surfaces.

At least a portion of the outer periphery R1 of the first end surface 10 is formed with cutting edges. Each of the cutting edges is formed in an inverted positive shape in which a flank facing the cutting edge has a negative clearance angle with respect to the peripheral side surface 30. In the illustrated example, one of the long sides of the outer periphery R1 of the first end surface 10 is formed with the first major cutting edge 11, while another long side is formed with the second major cutting edge 14. Each of the first and second major cutting edges 11 and 14 slightly protrudes into an arc shape in a direction further away from the central axis O.

The corner C1 is formed with the first corner cutting edge 12 adjacent to the first major cutting edge 11, while the corner C3 diagonal thereto is formed with the second corner cutting edge 15 adjacent to the second major cutting edge 14. Each of the second and fourth corners C2 and C4 is formed with no corner cutting edge. A portion of one of the short sides of the outer periphery R1 is formed with the first minor cutting edge 13 adjacent to the first corner cutting edge 12. A portion of another short side is formed with the second minor cutting edge 16 adjacent to the second corner cutting edge 15.

Configurations of the cutting edges are not limited to those in the illustrated example. For example, it may also be possible that the short sides of the outer periphery R1 of the first end surface 10 further include inner cutting edges located inward of the first and second major cutting edges 11 and 14 in the radial direction Dr of the tool body 3 to cut a workpiece material to be cut which is left uncut by the first and second major cutting edges 11 and 14. In that case, it is appropriate to form the first inner cutting edge between the first minor cutting edge 13 and the second major cutting edge 14 and form the second inner cutting edge between the second minor cutting edge 16 and the first major cutting edge 11.

For example, the first and second minor cutting edges 13 and 16 may also be configured as wiper edges that smoothen a finished surface of the workpiece material which has been cut by the first and second major cutting edges 11 and 14 in the radial direction Dr of the tool body 3. In that case, the flanks of the wiper edges may be formed appropriately to be substantially parallel with the finished surface. Each of the cutting edges 11 to 16 may be formed with a honing or formed with a land. The honing may be a round honing or a chamfer honing.

Figure 3:
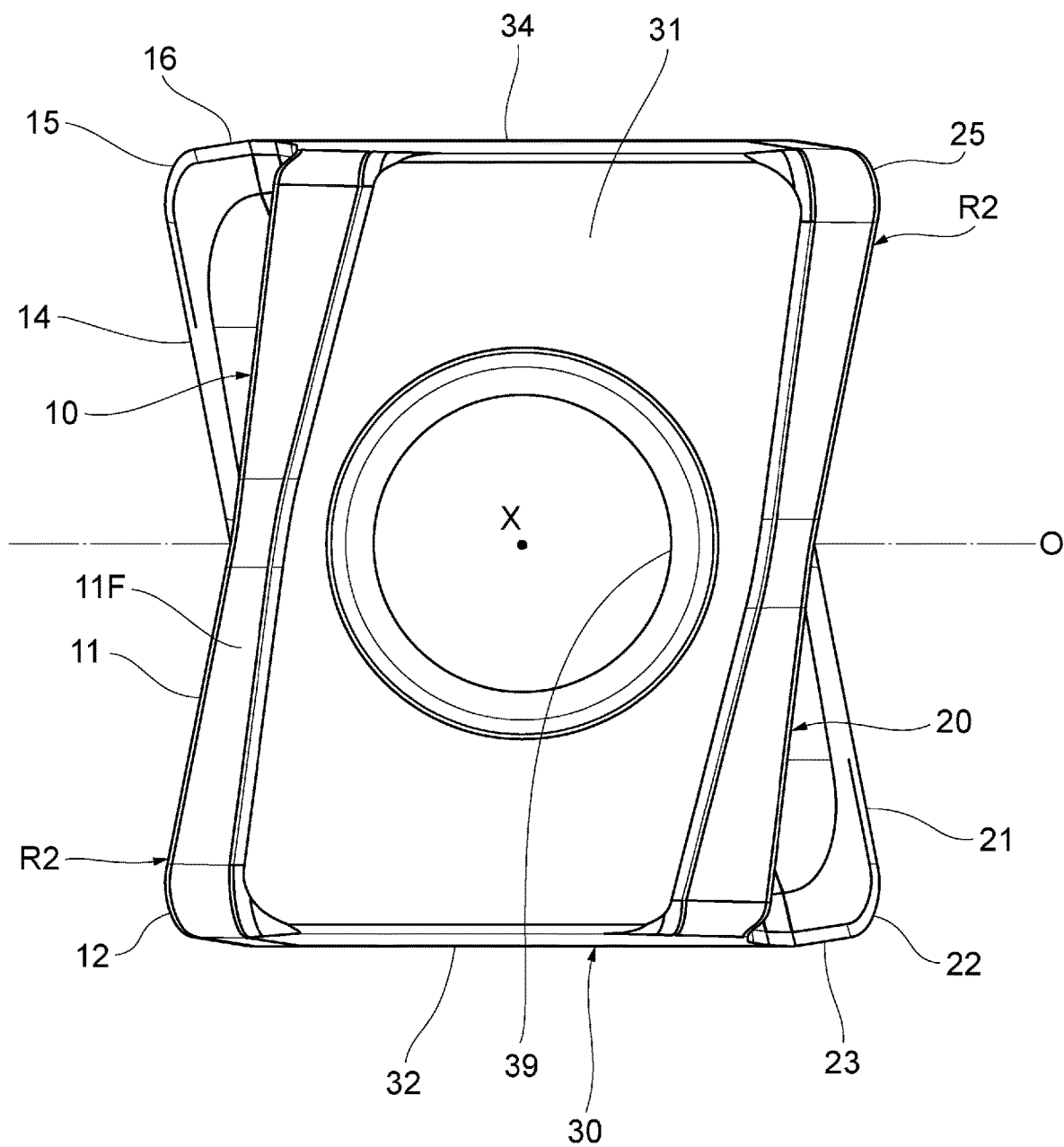
FIG. 3 is a side view obtained by viewing the cutting insert illustrated in FIG. 2 from a first side surface.

FIG. 3 is a side view obtained by viewing the cutting insert 2 illustrated in FIG. 2 from the first side surface 31 formed with the mounting hole 39. The outer periphery R2 of the second end surface 20 illustrated in FIG. 3 includes a third major cutting edge 21, a third corner cutting edge 22, a third minor cutting edge 23, a fourth major cutting edge 24, a fourth corner cutting edge 25, and a fourth minor cutting edge 26. The cutting edges 21 to 26 on the outer periphery R2 of the second end surface 20 have the same shapes and functions as those of the cutting edges 11 to 16 on the outer periphery R1 of the first end surface 10.

The peripheral side surface 30 connecting the first end surface 10 and the second end surface 20, i.e., the first to fourth side surfaces 31, 32, 33, and 34 extend to the outer peripheries R1 and R2 of the first and second end surfaces 10 and 20 at positions at which the cutting edges 11 to 16 and 21 to 26 are not formed on the outer peripheries R1 and R2 of the first and second end surfaces 10 and 20. Meanwhile, at positions at which the cutting edges 11 to 16 and 21 to 26 are formed on the outer peripheries R1 and R2, the peripheral side surface 30 extends to the vicinities of the outer peripheries R1 and R2. At such positions, the peripheral side surface 30 connects the first end surface 10 and the second end surface 20 via the flanks immediately below the cutting edges.

As illustrated in FIG. 3, a flank 11F facing the first major cutting edge 11 is formed to have a width decreasing with increasing distance from both ends of the first major cutting edge 11 toward a center of the first major cutting edge 11. In other words, in a thinner portion between the first end surface 10 and the mounting hole 39, the flank 11F is formed narrower.

Figure 4:
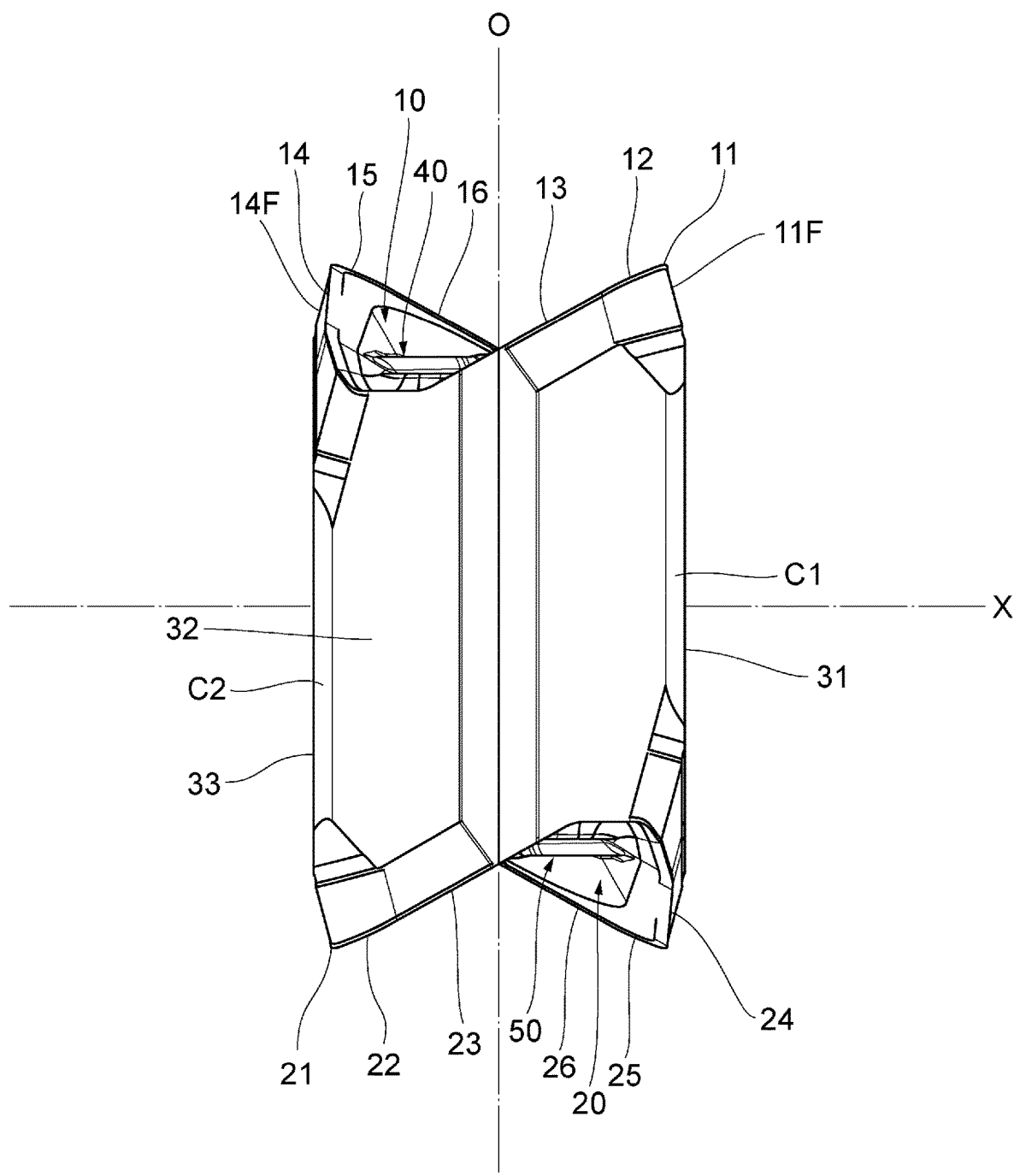
FIG. 4 is a side view obtained by viewing the cutting insert illustrated in FIG. 2 from a second side surface.

FIG. 4 is a side view obtained by viewing the cutting insert 2 illustrated in FIG. 2 from the second side surface 32. As described previously, the first and second major cutting edges 11 and 14 are formed in the inverted positive shapes in which the flank 11F and a flank 14F which face the cutting edges have negative clearance angles with respect to the first and third peripheral side surfaces 31 and 33. In other words, as illustrated in FIG. 4, the flanks 11F and 14F of the first and second major cutting edges 11 and 14 are inwardly inclined from the first major cutting edge 11 toward the second major cutting edge 14 facing the first major cutting edge 11 with increasing distance from the second end surface 20 toward the first end surface 10 opposite to the second end surface 20.

As illustrated in FIG. 4, in the cutting insert 2 configured as the vertically mounted insert, level differences between the restraint surface 19 formed at a bottom of the first end surface 10 and the cutting edges 11 to 16 are large. Since the first and second end surfaces 10 and 20 do not have the mounting hole 39, the first and second end surfaces 10 and 20 are small in size, and a distance between the first major cutting edge 11 and the second major cutting edge 14 is small. As a result, included angles of the cutting edges 11 to 16 are sharp. When the included angles are small, strengths of true edges are low, and the cutting edges are more likely to be chipped.

Figure 5:
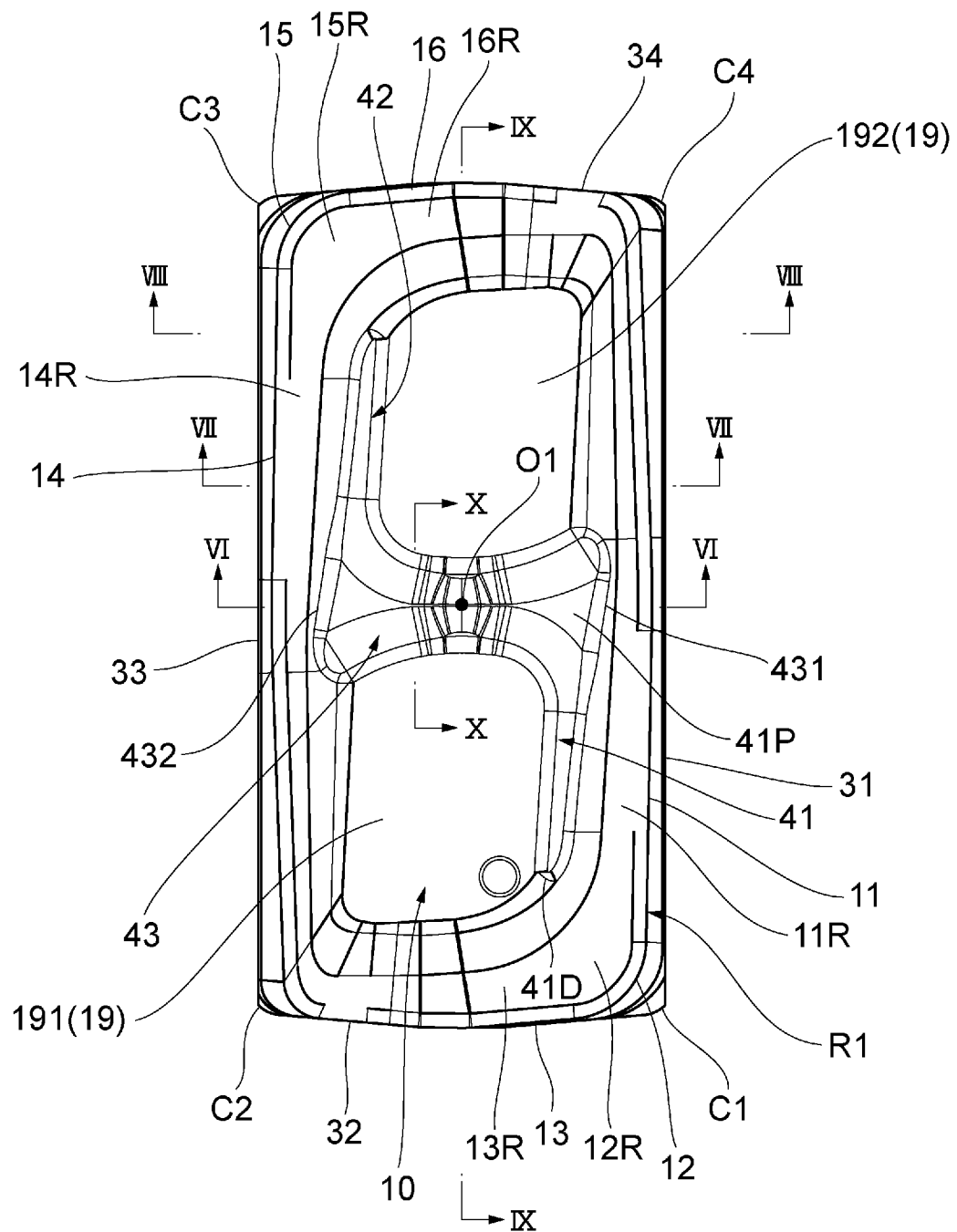
FIG. 5 is a plan view obtained by viewing the cutting insert illustrated in FIG. 2 from a first end surface.

FIG. 5 is a plan view obtained by viewing the cutting insert 2 illustrated in FIG. 2 from the first end surface 10. As illustrated in FIG. 5, the first end surface 10 has the cutting edges 11 to 16 formed on the outer periphery R1, the rake faces 11R to 16R located further inward of the first end surface 10 than the cutting edges 11 to 16, i.e., closer to the center O1 of the first end surface 10, the restraint surface 19 located further inward of the first end surface 10 than the rake faces 11R to 16R, and the reinforcing portion 40 projecting from the restraint surface 19 in a direction from the second end surface 20 to the first end surface 10 to reinforce the first end surface 10.

The rake faces 11R to 16R are adjacent to the corresponding cutting edges 11 to 16. In the following description, the rake face 11R adjacent to the first major cutting edge 11 may also be referred to as the first rake face 11R, and the rake face 14R adjacent to the second major cutting edge 14 may also be referred to as the second rake face 14R. The reinforcing portion 40 has the first to third projecting ridges 41, 42, and 43 and a projecting portion 44.

The third projecting ridge 43 is provided to extend between the first rake face 11R and the second rake face 14R to halve the restraint surface 19 into a first restraint surface 191 and a second restraint surface 192. As illustrated in FIG. 5, when the first end surface 10 is viewed in a direction from the first end surface 10 to the second end surface 20, the third projecting ridge 43 overlaps an axial line X of the mounting hole 39. The projecting portion 44 is located at the center O1 of the first end surface 10 to further project from the third projecting ridge 43 in the direction from the second end surface 20 to the first end surface 10.

The first projecting ridge 41 is connected to one end 431 of the third projecting ridge 43 and extends so as to cover at least a portion of the boundary B41 between the first rake face 11R and the restraint surface 19. In the illustrated example, the first projecting ridge 41 is disposed between the one end 431 of the third projecting ridge 43 and the first corner C1, but is not disposed between the one end 431 of the third projecting ridge 43 and the fourth corner C4.

Specifically, the first projecting ridge 41 extends from the one end 431 of the third projecting ridge 43 to a position immediately before the rake face 12R of the first corner cutting edge 12. A base end 41P of the first projecting ridge 41 is located in the vicinity of the one end 431 of the third projecting ridge 43, while a leading end 41D of the first projecting ridge 41 opposite to the base end 41P is located in the vicinity of a boundary between the rake face 12R of the first corner cutting edge 12 and the restraint surface 19.

A base end of the second projecting ridge 42 is connected to another end 432 of the third projecting ridge 43 and extends so as to cover at least a portion of the boundary B42 between the second rake face 14R and the restraint surface 19. As described previously, the first end surface 10 may also be 180° symmetrically formed around the center O1. In the illustrated example, the second projecting ridge 42 is formed 180° symmetrically to the first projecting ridge 41 to extend from the other end 432 of the third projecting ridge 43 to a position immediately before the rake face 15R of the second corner cutting edge 15.

Figure 6:
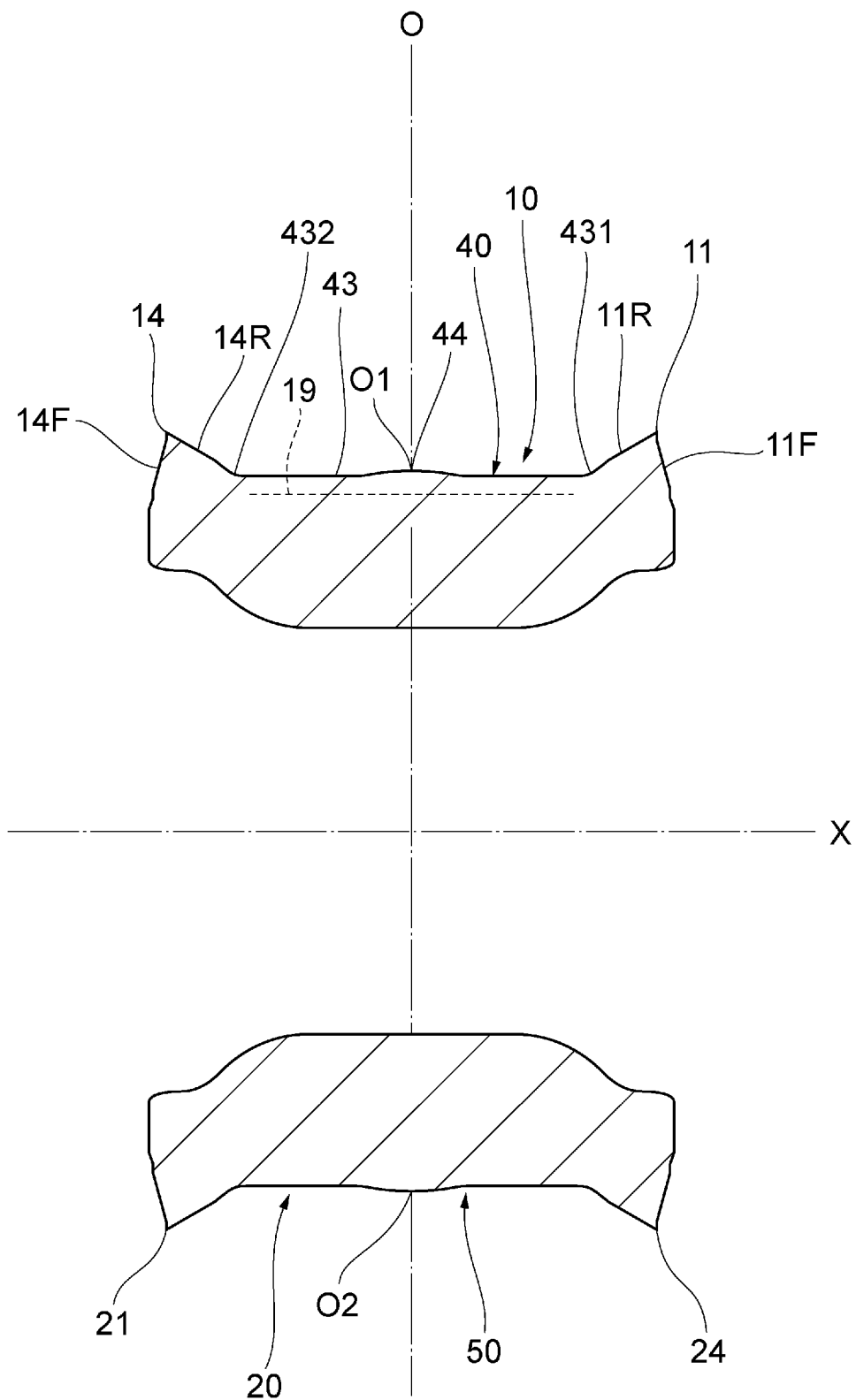
FIG. 6 is a cross-sectional view along a line VI-VI in FIG. 5.
Figure 7:
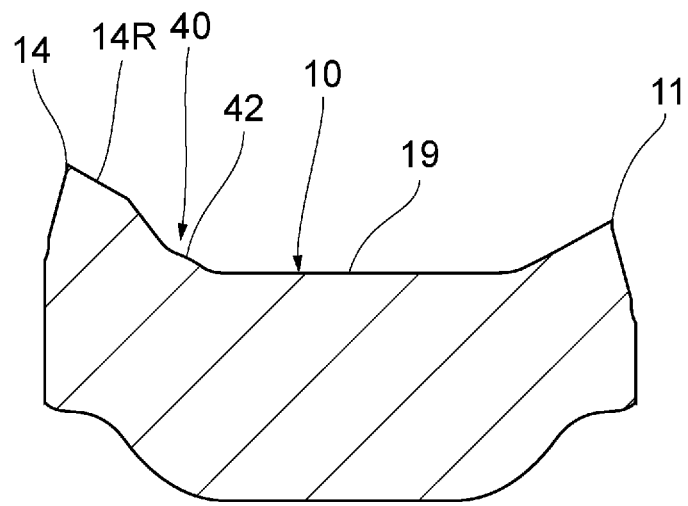
FIG. 7 is a cross-sectional view along a line VII-VII in FIG. 5.
Figure 7:
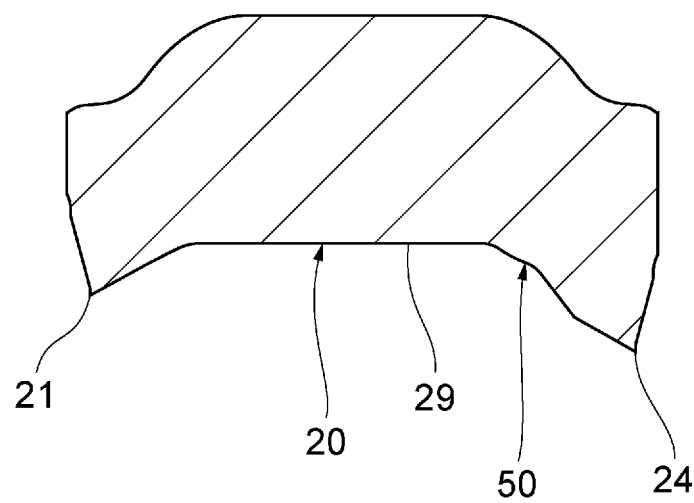
Figure 8:
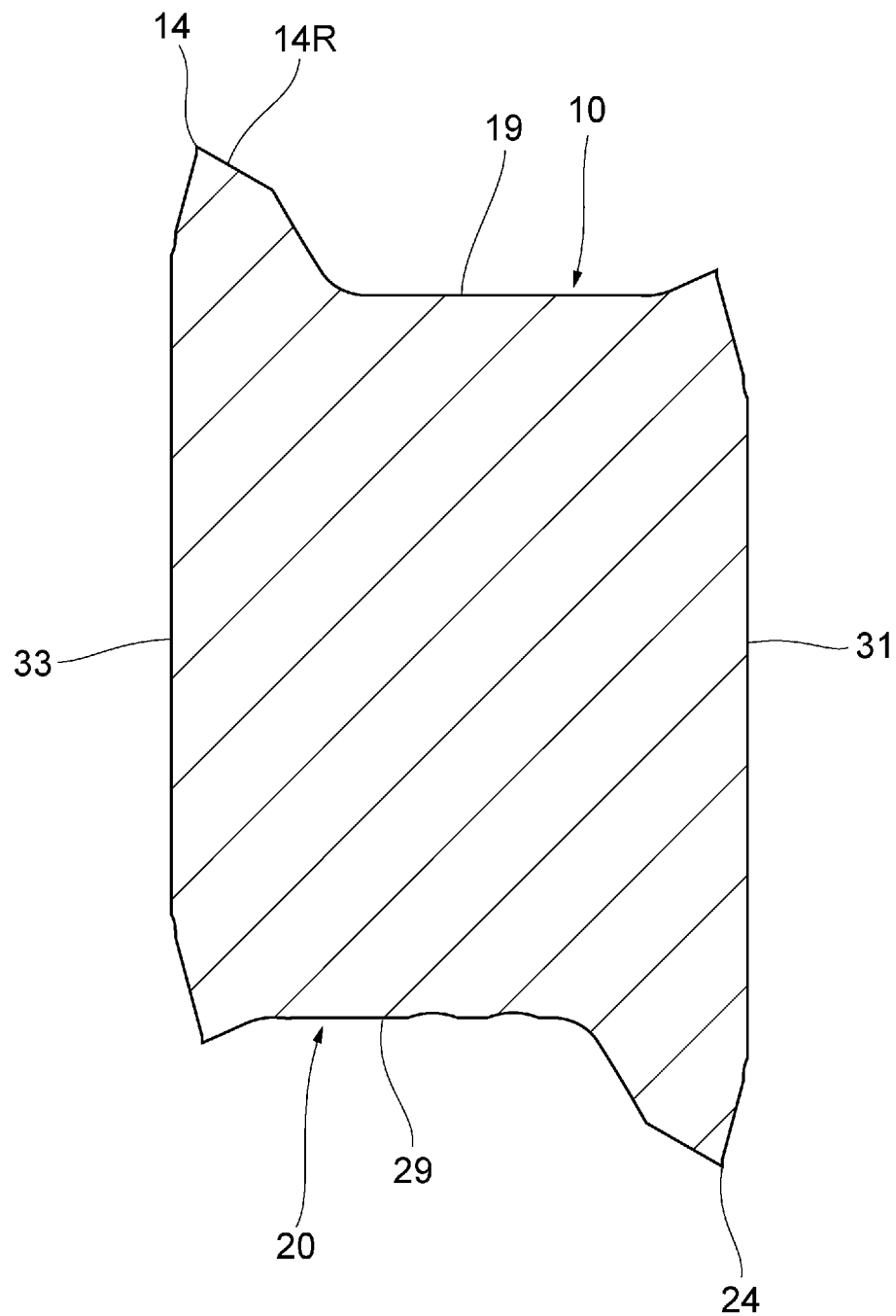
FIG. 8 is a cross-sectional view along a line VIII-VIII in FIG. 5.

FIG. 6 is a cross-sectional view along a line VI-VI in FIG. 5. FIG. 7 is a cross-sectional view along a line VII-VII in FIG. 5. FIG. 8 is a cross-sectional view along a line VIII-VIII in FIG. 5. As illustrated in FIGS. 7 and 8, the restraint surface 19 of the first end surface 10 is located at the bottom of the first end surface 10 to extend in a direction perpendicular to the central axis O (illustrated in FIG. 6) of the first and second end surfaces 10 and 20. Likewise, the restraint surface 29 of the second end surface 20 is located at a bottom of the second end surface 20 to extend in a direction perpendicular to the central axis O of the first and second end surfaces 10 and 20.

As illustrated in FIGS. 6 to 8, the second projecting ridge 42 projecting from the restraint surface 19 is formed such that an amount of the projection thereof gradually decreases with increasing distance from the other end 432 of the third projecting ridge 43 to the third corner C3. Likewise, the first projecting ridge 41 projecting from the restraint surface 19 is formed such that an amount of the projection thereof gradually decreases with increasing distance from the one end 431 of the third projecting ridge 43 to the first corner C1. As illustrated in FIG. 6, the third projecting ridge 43 projecting from the restraint surface 19 is formed such that an amount of the projection thereof is substantially constant from the first rake face 11R to the second rake face 14R. The projecting portion 44 further projects from a center of the third projecting ridge 43.

Figure 9:
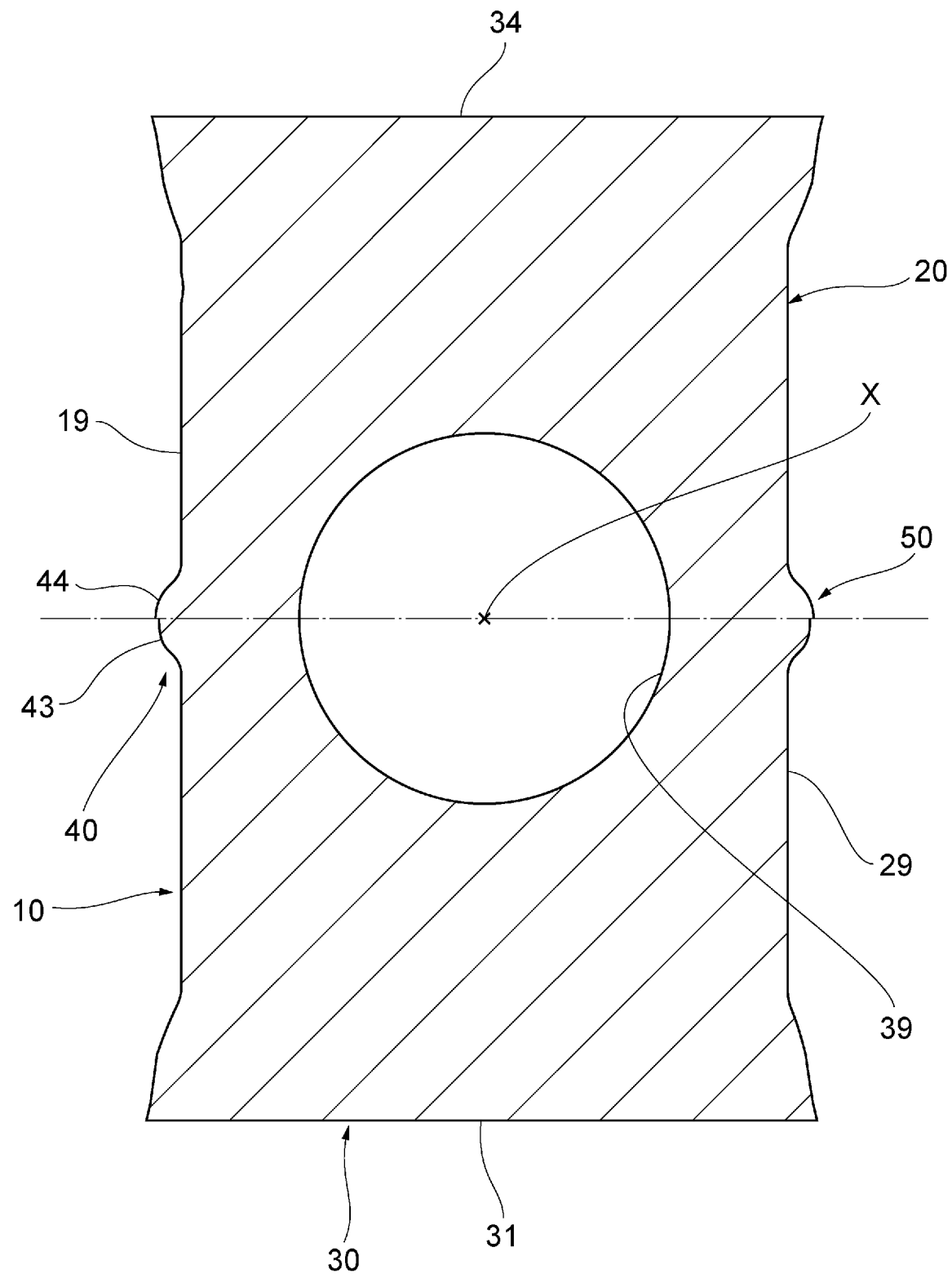
FIG. 9 has, in an upper half thereof, a cross-sectional view along a line IX-IX in FIG. 5 and has, in a lower half thereof, a cross-sectional view along a line X-X in FIG. 5.

FIG. 9 has, in an upper half thereof, a cross-sectional view along a line IX-IX in FIG. 5 and has, in a lower half thereof, a cross-sectional view along a line X-X in FIG. 5. As illustrated in FIG. 9, an amount of the projection of the projecting portion 44 from the restraint surface 19 to a top portion of the projecting portion 44 is larger than the amount of the projection of the third projecting ridge 43 from the restraint surface 19 to a top portion of the third projecting ridge 43. As illustrated in FIGS. 6 to 9, the reinforcing portion 40 of the first end surface 10 and the reinforcing portion 50 of the second end surface 20 are formed 180° symmetrically to each other around an axis crossing each of the central axis O of the first and second end surfaces 10 and 20 and the axial line X of the mounting hole.

The cutting insert 2 in the present embodiment thus configured allows the reinforcing portion 40 in which the first to third projecting ridges 41, 42, and 43 are integrated to continuously protect the first end surface 10 from the first rake face 11R to the second rake face 14R. Since the reinforcing portions 40 and 50 improve rigidities of the first and second end surfaces 10 and 20, even the vertically mounted insert having the sharp included angle is resistant to breakage.

The first projecting ridge 41 reinforcing the first major cutting edge 11 is formed on a normal to the first major cutting edge 11 to extend to a position immediately before the rake face 12R of the first corner cutting edge 12. Likewise, the second projecting ridge 42 reinforcing the second major cutting edge 14 is formed on a normal to the second major cutting edge 14 to extend to a position immediately before the rake face 15R of the second corner cutting edge 15. Chip produced during cutting flows out in a normal direction of each of the cutting edges. Since the chip flown out from the first major cutting edge 11 is continuous to the chip flown out from the first corner cutting edge 12, a direction in which the chip actually flows out is a direction synthesized based on a use ratio among the individual cutting edges.

According to the present embodiment, the first and second projecting ridges 41 and 42 separate the first and second rake faces 11R and 14R and the restraint surface 19 from each other, and consequently the chip produced during cutting is less likely to reach the restraint surface 19. Since the surface of the restraint surface 19 is less likely to be roughened, when the cutting insert 2 is turned upside down and the cutting edges 21 to 26 formed on the outer periphery R2 of the second end surface 20 are to be used, the state where the cutting insert 2 is restrained is stabilized.

The embodiments described above are intended to facilitate understanding of the present invention and should not be construed to limit the present invention. Constituent elements included in the embodiments and arrangements, materials, conditions, shapes, sizes, and the like thereof are not limited to those exemplified and can appropriately be modified. It is also possible to partially substitute or combine configurations described in different embodiments.

What is claimed is:

1. A cutting insert fixed fixable to a tool body to compose an indexable milling tool, the cutting insert comprising:
    a first end surface;
    a second end surface on an opposite side to the first end surface; and
    a peripheral side surface joining the first end surface and the second end surface together, the cutting insert being configured as a vertically mounted insert having a mounting hole formed to extend through the peripheral side surface,
    the second end surface having:
    a third major cutting edge formed on an outer periphery of the second end surface,
    the first end surface having:
    a first major cutting edge formed on an outer periphery of the first end surface;
    a first rake face located further inward of the first end surface than the first major cutting edge and adjacent to the first major cutting edge;
    a second major cutting edge formed on the outer periphery of the first end surface and facing the first major cutting edge;
    a second rake face located further inward of the first end surface than the second major cutting edge and adjacent to the second major cutting edge;
    a restraint surface located further inward than each of the first rake face and the second rake face to come into contact with the tool body when the third major cutting edge is used; and
    a reinforcing portion projecting from the restraint surface in a direction from the second end surface to the first end surface,
    the reinforcing portion having:
    a third projecting ridge provided to extend between the first rake face and the second rake face and halve the restraint surface;
    a first projecting ridge connected to a first end of the third projecting ridge to extend so as to cover at least a portion of a boundary between the first rake face and the restraint surface; and
    a second projecting ridge connected to a second end of the third projecting ridge to extend so as to cover at least a portion of a boundary between the second rake face and the restraint surface, wherein
    the outer periphery of the first end surface is formed in a substantially rectangular shape having first to four corners,
    the first major cutting edge is located on a long side of the rectangle between the first corner formed with a corner cutting edge and the fourth corner formed with no corner cutting edge, and
    the first projecting ridge is not disposed between the first end of the third projecting ridge and the fourth corner, while being disposed between the first end of the third projecting ridge and the first corner.

2. The cutting insert according to claim 1, wherein the reinforcing portion further has a projecting portion located at a center of the first end surface to project from the third projecting ridge in the direction from the second end surface to the first end surface.

3. The cutting insert according to claim 2, wherein, when the first end surface is viewed in a direction from the first end surface to the second end surface, the third projecting ridge is superimposed on an axial line of the mounting hole.

4. The cutting insert according to claim 1, wherein the reinforcing portion further has a projecting portion located at a center of the first end surface to project from the third projecting ridge in the direction from the second end surface to the first end surface.

5. The cutting insert according to claim 4, wherein, when the first end surface is viewed in a direction from the first end surface to the second end surface, the third projecting ridge is superimposed on an axial line of the mounting hole.

6. The cutting insert according to claim 1, wherein, when the first end surface is viewed in a direction from the first end surface to the second end surface, the third projecting ridge is superimposed on an axial line of the mounting hole.

7. The cutting insert according to claim 1, wherein, when the first end surface is viewed in a direction from the first end surface to the second end surface, the third projecting ridge is superimposed on an axial line of the mounting hole.

* * * * *